United States Patent [19]

Sega et al.

[11] Patent Number: 4,477,221
[45] Date of Patent: Oct. 16, 1984

[54] ARM FOR A PROGRAMME CONTROLLED MANIPULATOR

[75] Inventors: Masahisa Sega, Tokyo; Akira Kikuchi, Kawasaki, both of Japan

[73] Assignee: Tokico Ltd., Japan

[21] Appl. No.: 338,055

[22] Filed: Jan. 8, 1982

[30] Foreign Application Priority Data

Jan. 28, 1981 [JP] Japan .................. 56/11058

[51] Int. Cl.³ ............................................. B25J 9/00
[52] U.S. Cl. ....................................... 414/735; 414/4;
901/29; 901/37; 92/121
[58] Field of Search .......... 308/189 A, 184 A, 207 A;
414/730, 732, 735, 738; 92/121-125; 901/29,
37; 414/4

[56] References Cited

U.S. PATENT DOCUMENTS

| | | | |
|---|---|---|---|
| 1,746,978 | 2/1930 | Winkler | 308/207 A |
| 3,726,576 | 4/1973 | Barnbrook et al. | 308/207 A |
| 4,107,948 | 8/1978 | Molaug . | |
| 4,231,622 | 11/1980 | Paullin | 308/207 A |
| 4,378,959 | 4/1983 | Susnjara | 414/732 |

FOREIGN PATENT DOCUMENTS

| | | | |
|---|---|---|---|
| 2815298 | 10/1979 | Fed. Rep. of Germany | 92/121 |
| 2378612 | 1/1977 | France . | |
| 2100226 | 12/1982 | United Kingdom | 414/730 |

Primary Examiner—Robert J. Spar
Assistant Examiner—Terrance L. Siemens
Attorney, Agent, or Firm—Cushman, Darby & Cushman

[57] ABSTRACT

An elephant nose type arm for a programme controlled manipulator, comprises a cylindrical rod, a flexible arm coupled at one end thereof to the rod, an actuator mounted on the other end of the flexible arm, and a tool attached to the other end of the flexible arm and rotated by actuation of the actuator.

8 Claims, 10 Drawing Figures

4,477,221

ARM FOR A PROGRAMME CONTROLLED MANIPULATOR

BACKGROUND OF THE INVENTION:

1. Field of the Invention:

The present invention relates to a flexible arm for use in an industrial robot or a programme controlled manipulator.

2. Description of the Prior Art:

There has been known a programme controlled manipulator comprising a support post mounted on a turntable, an arm swingably attached to one end of the support post, and a paint spray gun or nozzle carried on a free end of the arm so that the paint spray gun can automatically be brought to a desired position by angularly moving the support post and the arm for performing painting operation.

The known arm of the manipulator is generally not freely bendable, rendering it relatively difficult to control the paint spray gun to be brought into any desired position. Therefore, the conventional manipulator arm can work only with work-pieces of relatively simple configurations, and has found limited use.

Various bendable or flexible manipulator arms have been proposed in the recent past. However, the proposed arms are complex in construction, and where there are relatively long, they tend to flex by their own weight, resulting in a difficulty to place the spray nozzle in a desired position. One way to cope with this problem would be to assemble the arm of highly rigid parts, but such an arrangement would not be practically preferable.

The proposed manipulator arms are flexibly bendable only through limited angular intervals or distances by corresponding displacements of actuators, and hence fail to operate efficiently or make the most use of the advantages accruing from the bendability of the arms.

The actuator in most applications is mounted on the base and operatively connected through a universal joint to the paint spray nozzle serving as a tool mounted on the free end of the arm for transmitting rotation from the actuator to the spray nozzle. With the nozzle coupled to the actuator via the universal joint, operation of the nozzle is adversely affected by a backlash or play in the universal joint. Unless such a backlash is reduced to a large degree or virtually eliminated, an angular displacement of the nozzle does not conform with the angular displacement of the actuator that has produced the nozzle displacement, failing to bring the nozzle to a desired angular position. This problem becomes worse especially when the arm is used on teaching-playback type manipulators, in that positioning the spray gun upon playback based on positional data obtained during teaching operation often fails to bring the spray gun precisely to a desired position determined upon teaching.

SUMMARY OF THE INVENTION

It is an object of the present invention to provide a manipulator arm which has desired operation characteristics free of any problems caused by backlashes or plays in the manipulator arm.

Another object of the present invention is to provide a manipulator arm having an actuator for directly rotating a tool with a backlash or play between the actuator and the tool being substantially eliminated.

Still another object of the present invention is to provide a manipulator arm which is capable of bringing, upon playback, a tool thereon precisely to a desired position determined by a teaching operation.

Still another object of the present invention is to provide a manipulator arm which includes couplings having a reduced backlash or play for bringing the free end of a tool precisely to a taught position upon playback.

Still another object of the present invention is to provide a manipulator arm which can accurately position the free end of a tool during teaching operation.

According to the present invention, there is provided a manipulator arm comprising a base member, a flexible arm coupled at one end thereof to the base member and having a series of arm members coupled swingably to each other and at least one of link members coupled swingably to said arm members, a first rotary actuator for rotating said flexible arm, said flexible arm being coupled to said base member through said first rotary actuator, a second rotary actuator mounted on the other end of the flexible arm, and a tool attached to the other end of the flexible arm and rotated by the rotation of the second rotary actuator.

The above and other objects and features of the present invention will become more apparent from the following description when taken in conjunction with the accompanying drawings which show a preferred embodiment of the present invention. The present invention, however, should not be interpreted as being limited to the illustrated embodiment.

Figure 1:
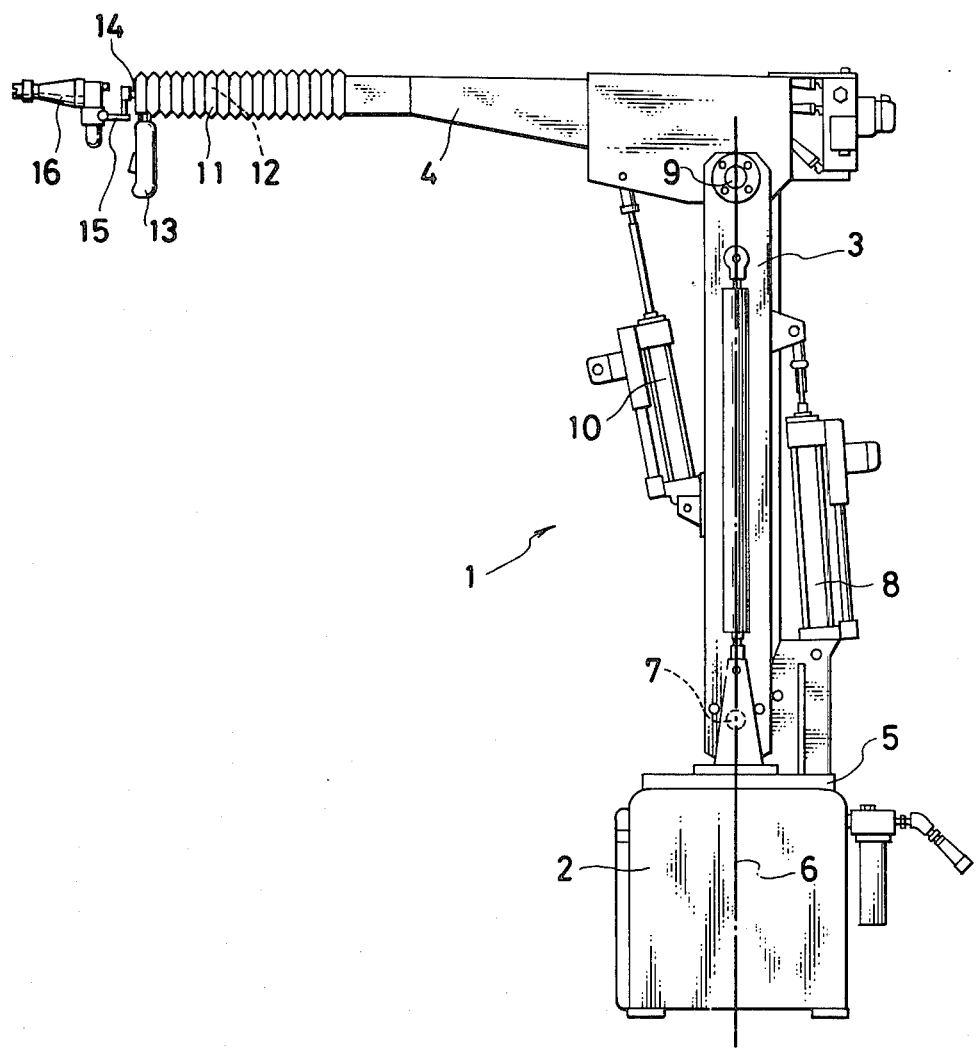
FIG. 1 is a side view of a manipulator according to a preferred embodiment of the present invention.

DESCRIPTION OF THE PREFERRED EMBODIMENT:

As shown in FIGS. 1 to 8, a manipulator 1 comprises a platform 2, a support post 3 and an elongated non-flexible arm 4, the support post 3 being mounted on a turntable 5 disposed on the platform 2 for rotation with the turntable 5 about a center line or vertical axis 6. The platform 2 houses therein an actuator (not shown) for rotating the turntable 5. The support post 3 is supported on a bracket provided on the turntable 5 through a shaft 7 for swinging movement about the shaft 7 in a vertical plane. The support post 3 is angularly movable by a hydraulic cylinder 8 serving as an actuator provided between the support post 3 and the turntable 5. The arm 4 is operatively connected at one end thereof through a shaft 9 to the support post 3 and is angularly movable in a vertical plane by an actuator or hydraulic cylinder 10 provided between the arm 4 and the support post 3.

The arm 4 supports on other end thereof a flexible or bendable arm 12 which is covered with an extendible and flexible dust cover 11. The flexible arm 12 has on the other end thereof a grip handle 13 which is to be gripped by the operator while teaching the manipulator 1 in order to be programme controlled. A paint spray gun 16 as a tool is attached through a supporting member 15 to a rod 14 protruding from the arm 12.

From the free end of the arm 4, there extends a base or cylindrical rod 17 fixed at one end to the arm 4 by means of a bolt and supporting on the other end a cylindrical casing 19 of a rotary actuator 18. A pair of first confronting arm members 20 is fixed at one end to the cylindrical casing 19, the arm members 20 being interconnected by a plate member 21 extending therebetween. An actuator or hydraulic cylinder 22 has a piston rod 23 with a projecting end 24 on which a pair of second arm members 26 is swingably mounted through a shaft 25. The second arm members 26 are pivotably supported on the first arm members 20 through a shaft 27 located substantially centrally of the second arm members 26. A pair of third confronting arm members 28 is rotatably mounted on the arm members 26 through a shaft 29 disposed substantially centrally widthwise of the arm members 28. One end of each arm member 28 is disposed closer to the rod 17 than the other end of each arm member 28 and; is angularly movably attached through a shaft 30 to one end of a link member 31, the other end of link member 31 being pivotably connected by a shaft 32 to other end of the arm members 20. The arm members 28 are connected to each other by a pair of plate members 33 bridging the arm members 28. The arm members 26 have ends pivotably connected by shafts 34 respectively to one end of each link member 35, the other end of each link member 35 being swingably connected by shafts 36 to those ends of a pair of fourth confronting arm members 37 which are disposed closer to the rod 17 than the other ends of arm members 37. The fourth arm members 37 are angularly movably coupled to the arm members 28 by a shaft 38 positioned substantially centrally widthwise of the arm members 37. A pair of fifth confronting arm members 39 have ends closer to the rod 17 which are coupled through a shaft 41 to one end of a link member 40 with the other end thereof swingably connected by a shaft 42 to the arm members 28 at one end thereof. The arm members 39 are angularly movably coupled to the arm members 37 respectively by shafts 44 disposed substantially centrally widthwise of the arm members 37.

Figure 5:
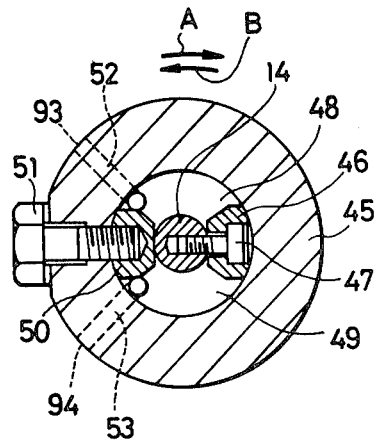
FIG. 5 is an enlarged cross-sectional view taken along line V—V of FIG. 2.

An actuator 43 has a cylindrical casing 45 secured to the arm members 39 and through which extends the rod 14 so as to be rotatable about its own axis. A compartment member 46 is fixed to the rod 14 by a bolt 47, and another compartment member 50 is fixed to the casing 45 by a bolt 51, as shown in FIG. 5. The members 46, 50 are disposed in the cylindrical casing 45 and divide the interior of the casing 45 into two fluid chambers 48, 49. The cylindrical casing 45 has passages 52, 53 defined therethrough and opening respectively into the chambers 48, 49. When oil is supplied through the passage 52 into the chamber 48 and discharged through the passage 53 out of the chamber 49, the rod 14 is caused to rotate with the member 46 in the direction of the arrow A. When oil flows under pressure in the opposite direction, the rod 14 is forced to rotate in the direction of the arrow B. A potentiometer 54 has a rotative shaft 55 attached coaxially to one end of the rod 14, and includes a housing fixedly mounted on the casing 45. The potentiometer 54 serves to electrically detect an angular position of the rod 14.

Figure 2:
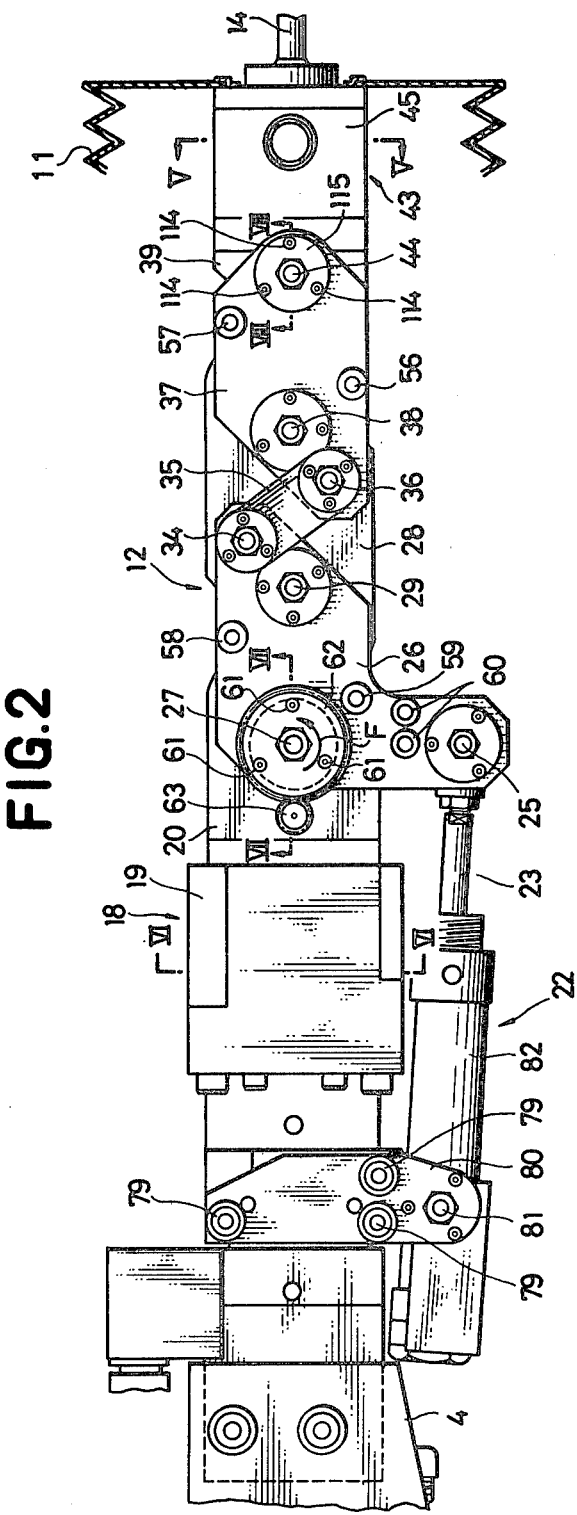
FIG. 2 is an enlarged side view of a flexible arm in the manipulator shown in FIG. 1.
Figure 7:
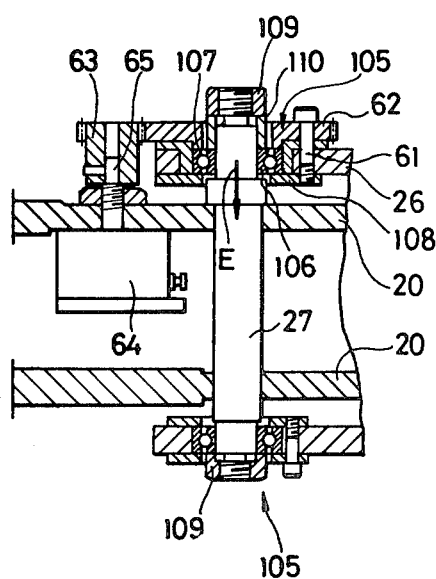
FIG. 7 is an enlarged cross-sectional view taken along line VII—VII of FIG. 2.
Figure 8:
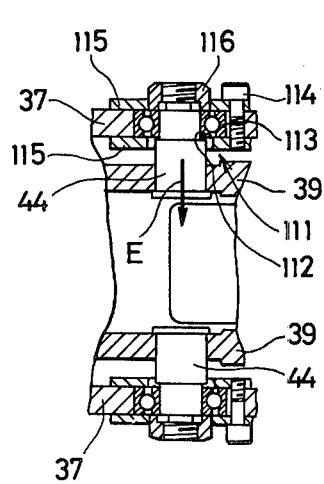
FIG. 8 is an enlarged cross-sectional view taken along line VIII—VIII of FIG. 2.

The arm members 37 are spaced apart a distance from each other by reinforcement members 56, 57 having ends threaded through the arm members 37. Likewise, the arm members 26 are spaced from each other by similar reinforcement members 58, 59 and 60 having ends threaded through the arm members 26. As shown in FIGS. 2 and 7, a gear 62 is secured by screws 61 to one of the pair of arm members 26 and held in driving mesh with a gear 63 which is fixed coaxially to a rotative shaft 65 of a potentiometer 64 installed on one of the pair of arm members 20. Thus, the potentiometer 64 serves to electrically detect an angular position of the arm members 26.

Figure 6:
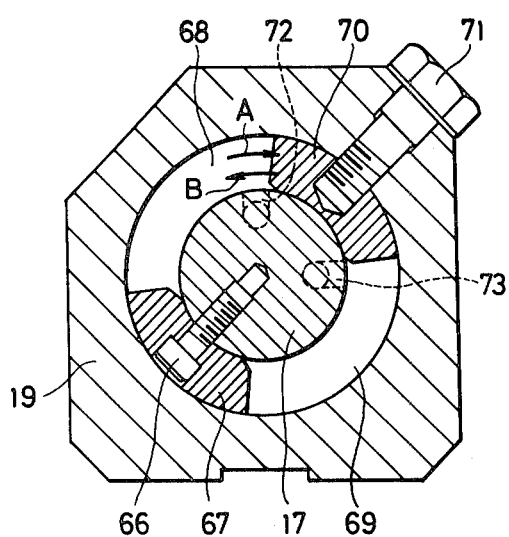
FIG. 6 is an enlarged cross-sectional view taken along line VI—VI of FIG. 2.

In FIG. 6, a compartment member 67 is attached by a bolt 66 to the rod 17 which extends axially through the casing 19, and another compartment member 70 is secured to the casing 19 by a bolt 71. The members 67, 70 are disposed inside the casing 19 and separate the interior of the casing 19 into two fluid chambers 68, 69. The rod 17 has passages 72, 73 defined therein and opening respectively into the chambers 68, 69. When oil flows under pressure from an external source of oil into the chamber 68 via the passage 72 and is discharged out of the chamber 69 through the passage 73, the casing 19 is forced to rotate with the member 70 in the direction of the arrow A. Oil flow in the opposite direction causes the casing 19 to rotate in the direction of the arrow B.

Figure 3:
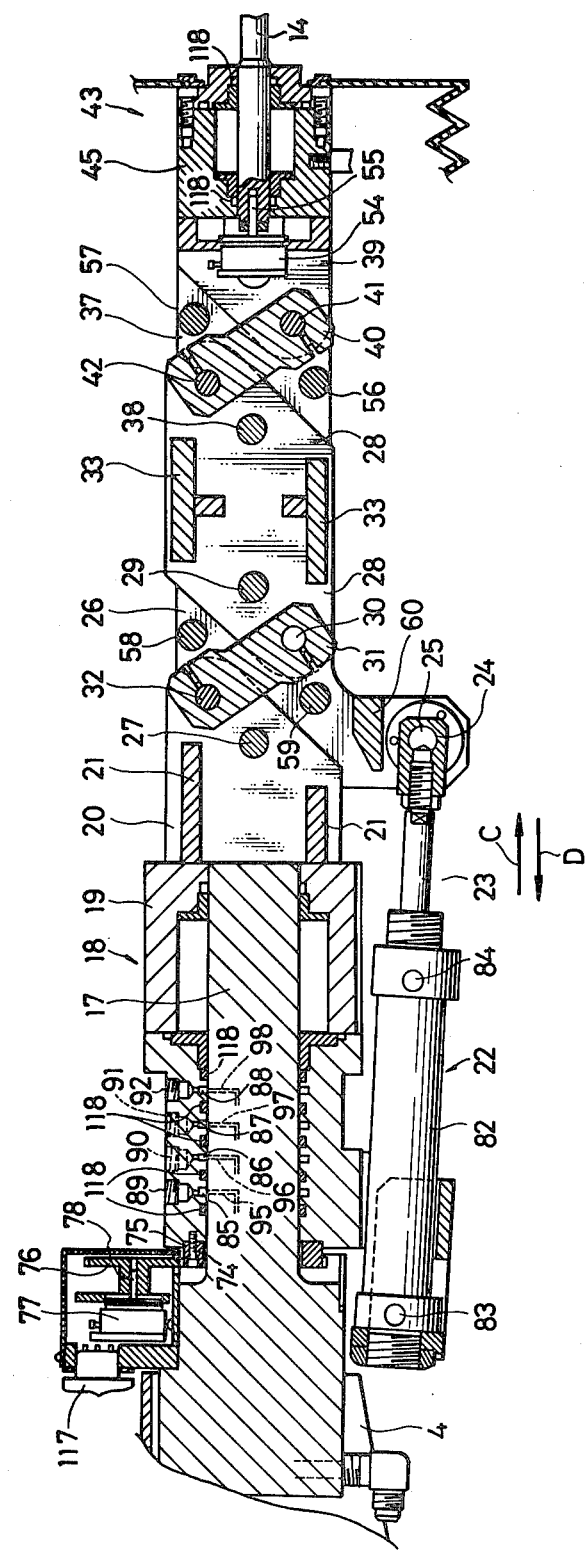
FIG. 3 is a cross-sectional view taken along line III—III of FIG. 4.

As shown in FIG. 3, an annular gear 75 is fixed to the casing 19 by screws 74 and held in driving mesh with a gear 76 secured coaxially to a rotative shaft 78 of a potentiometer 77 mounted on the rod 17. Thus, an angular position of the casing 19 is electrically detected by the potentiometer 77. In FIGS. 2 and 3, the hydraulic cylinder 22 includes a cylinder body 82 swingably supported through a shaft 81 on a pair of support members 80 fixedly mounted on the casing 19 by means of bolts 79. The piston rod 23 has a piston (not illustrated) slidably fitted in the cylinder body 82 and dividing the interior of the body 82 into two chambers. Oil under pressure can be supplied into and discharged out of one of the cylinder chambers through a port 83, and also can be fed into and out of the other cylinder chamber through a port 84. The piston rod 23 is forced to move in the direction of the arrow C when pressurized oil enters through the port 83 into said one of the cylinder chambers and oil is discharged out of the other cylinder chamber through the port 84. Conversely, introduction of oil under pressure into the other cylinder chamber through the port 84 with oil forced out of said one cylinder chamber through the port 83 causes the piston rod 23 to be displaced in the direction of the arrow D.

Figure 4:
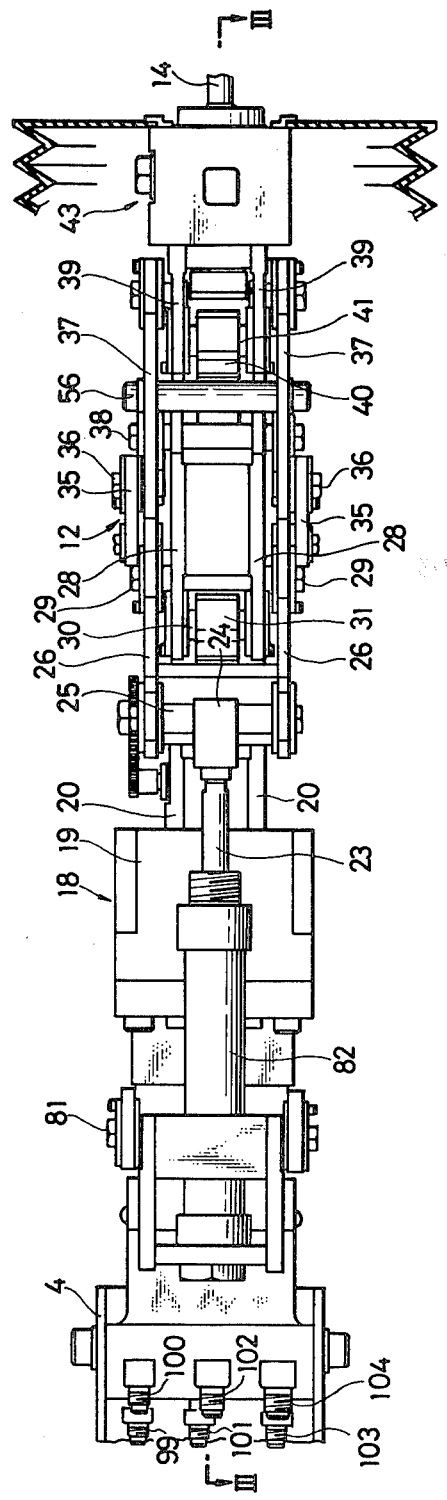
FIG. 4 is a bottom view of the flexible arm illustrated in FIG. 2.

As illustrated in FIG. 3, the casing 19 has annular grooves 85-88 and radial holes 89-92 communicating with the annular grooves 85-88, respectively. The holes 89, 92 communicate respectively with the ports 83, 84 through flexible pipes (not shown), and the holes 90, 91 communicate through flexible pipes (not shown) respectively with open ends 93, 94 (FIG. 5) of the passages 52, 53 in the casing 45. The rod 17 has passages 95-98 defined therethrough and held in communication with the annular grooves 85-88, respectively. The passages 95-98 and the passages 72, 73 (FIG. 6) are held in communication with fittings 99-104, respectively, mounted on an end face of the rod 17, as shown in FIG. 4.

A ball bearing 105 (FIG. 7) includes an inner race 106 fitted over the shaft 27 and an outer race 107 interposed between the gear 62 and an annular stop 108 which are secured to one of the arm members 26 by the bolts 61. Between the inner race 106 of the ball bearing 105 and a nut 109 threaded over the shaft 27, there is disposed a collar 110 which is fitted over the shaft 27 and can be urged upon tightening of the nut 109 to force the inner race 106 in the direction of the arrow E. With the inner race 106 thus axially biased, the ball bearing 105 has a smaller degree of backlash or play. The other shafts 25, 29, 30, 32, 34, 36, 38, 41, 42, 44 and 81 are equipped with similar ball bearings which have the same means as that incorporated in the ball bearing 105 for reducing a backlash. For example, a ball bearing 111 (FIG. 8) mounted on one of the shafts 44 has an inner race 112 fitted over the shaft 44 and an outer race 113 interposed between a pair of annular stops 115 fixed by bolts 114 to the arm member 37. The inner race 112 is urged by tightening a nut 116 threaded on the shaft 44 in the direction of the arrow E. Such an arrangement assists the ball bearing 111 in reducing a backlash or play therein. The shafts 44 are secured directly to the arm members 39.

The rod 17 supports thereon a connector 117 (FIG. 3) for deriving electrical signals from the potentiometers 54, 64 and 77. A plurality of seal rings 118 are disposed around the rod 17 and 14.

Briefly summarized, the flexible arm 12 is constructed such that alternate arm members are swingably connected by link members to enable the piston rod of an actuator to angularly move one pair of arm members relatively to an adjacent pair of arm members through an angular displacement, which can then be transmitted to angularly displace a subsequent pair of arm members.

The manipulator 1 with the flexible manipulator arm 12 thus constructed will operate as follows. When the actuator in the platform 2 is activated, the support post 3 rotates about the center line 6. The support post 3 is angularly moved by the hydraulic actuator 8 about the shaft 7 in the vertical plane, and the arm 4 is angularly moved by the hydraulic acutator 10 about the shaft 9 in the vertical plane. When oil under pressure is supplied from an external source of oil through the fitting 103 and the passage 72 into the chamber 68, and oil is discharged out of the chamber 69 through the passage 73 and the fitting 104, the casing 19 is rotated in the direction of the arrow A, thus causing the arm 12 and the spray gun 16 to rotate also in the direction of the arrow A. Conversely, when oil is discharged out of the chamber 68 and fed into the chamber 69, the casing 19, the arm 12 and the spray gun 16 rotate in the direction of the arrow B.

Figures 9, 10:
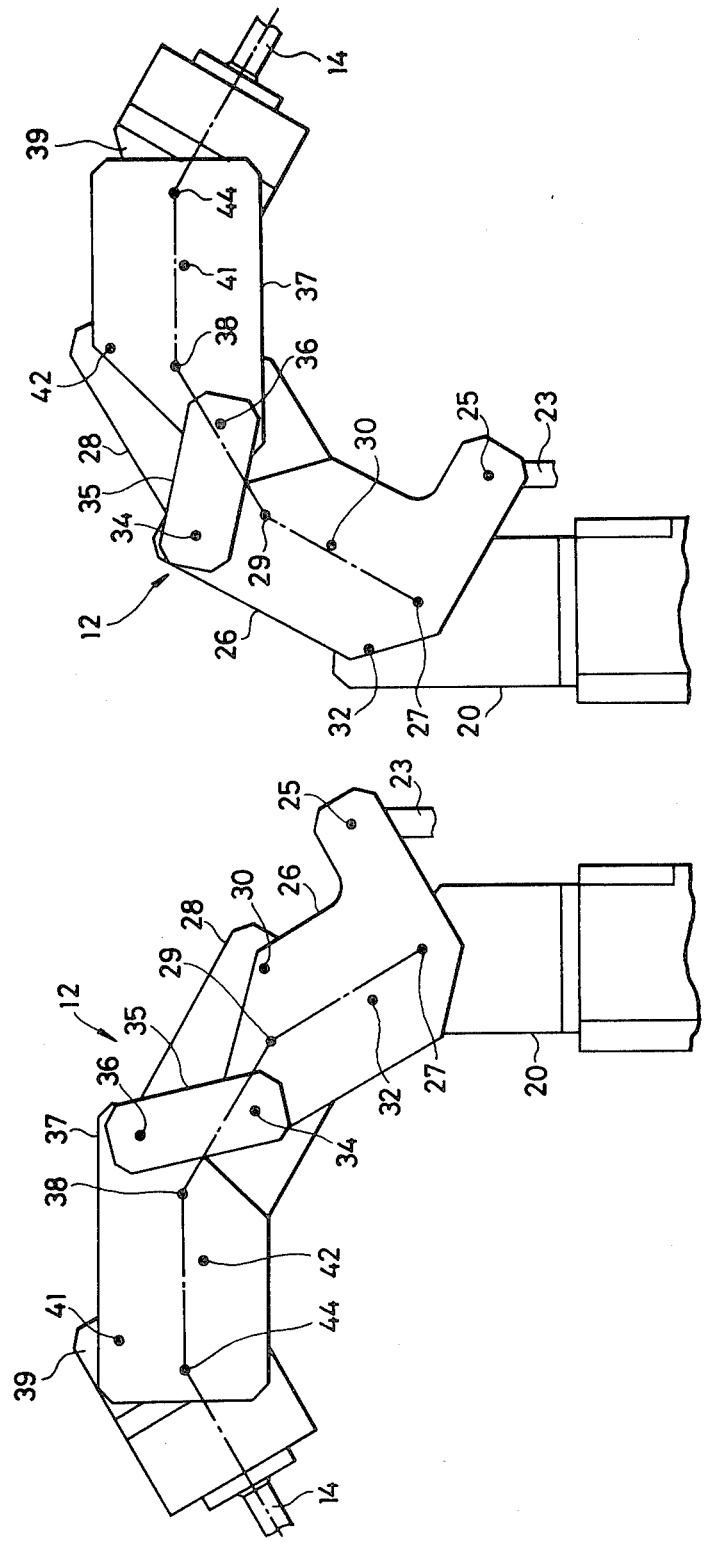
FIGS. 9 and 10 are diagrammatic side views of the flexible arm of FIG. 2 as it is actuated.

When oil under pressure is fed from an external supply through the fitting 100, the passage 96, the hole 90, and the passage 52 into the chamber 48 as oil is forced out of the chamber 49 through the passage 53, the hole 91, the passage 97 and the fitting 101, the rod 14 and hence the spray gun 16 are caused to rotate in the direction of the arrow A. Conversely, when oil goes out of the chamber 48 as the chamber 49 is supplied with pressurized oil, the rod 14 and the spray gun 16 rotate in the direction of the arrow B. The piston in the cylinder body 82 and hence the rod 23 are caused to move in the direction of the arrow C (FIG. 3) when oil under pressure is fed into said one chamber in the cylinder body 82 through the fitting 99, the passage 95, the hole 89, and the port 83 while oil is fed out of the other cylinder chamber through the port 84, the hole 92, the passage 98, and the fitting 102. Movement of the rod 23 in the direction of the arrow C causes the arm member 26 coupled to the rod 23 to swing about the shaft 27 in the direction of the arrow F. When the arm member 26 is angularly moved in the direction of the arrow F, the link member 31 is turned about the shaft 32 in the direction of the arrow F, and at the same time the arm member 28 is also turned about the shaft 29 in the direction of the arrow F. Angular movement of the arm member 28 in the direction of the arrow F causes the link member 35 to pivot about the shaft 34 in the direction of the arrow F, resulting in swinging movement of the arm member 37 about the shaft 38 in the direction of the arrow F. As the arm member 37 is angularly moved in the direction of the arrow F, the link member 40 is caused to turn about the shaft 42 in the direction of the arrow F, and the arm member 39 is simultaneously turned about the shaft 44 in the direction of the arrow F. As a consequence, the arm 12 is flexibly bent as illustrated in FIG. 9. With the arm 12 thus bent, the rod 14 and hence the spray gun 16 can be rotated by the actuation of the hydraulic actuator 43, and the arm 12 itself can be rotated by the actuation of the rotary actuator 18. When oil under pressure is fed into the other chamber in the cylinder body 82 and out of said one cylinder chamber, the rod 23 is axially displaced in the direction of the arrow D causing the arm 12 to be flexibly bent as shown in FIG. 10 in the direction opposite to that in which the arm 12 is bent as illustrated in FIG. 9. The rod 14 and the arm 12 can independently be rotated when the arm 12 is bent as shown in FIG. 10.

While in the illustrated embodiment the arm members are provided in pairs, they may be of single unitary constructions, respectively. The rod 14 may project from the third arm members, and sixth arm members or additional arm members and link members may be operatively coupled in constituting a flexible arm. The hydraulic actuator 22 for angularly moving the arm 12 may be replaced with a rotary actuator which is of the same structure as that of the actuators 18, 43 and which has a casing secured to the arm members 20 for directly rotating the shaft 27. The pipes which are connected between the holes 90, 91 and the openings 93, 94 may extend along the arm 12 either exteriorly or interiorly thereof. To reduce a backlash or play in each shaft, the shaft may be spring-biased laterally in the axial direction thereof. While the rod 14 is shown as projecting in the direction in which the arm 12 extends, the rod 14 may project perpendicularly to that direction, and the actuator 43 may be so mounted on the free end of the arm 12 as to rotate the rod 14 thus directed about its own axis. The arm 4 and the arm 12 attached thereto may be replaced with a single unitary flexible arm mounted on the support post 3 or the turntable 5. The present invention is not limited to a manipulator with a paint spray gun, but is applicable to a manipulator for welding use, with a welding torch as the manipulator tool, or a manipulator for gripping objects.

With the arrangement of the present invention, the manipulator 1 with the freely flexible or bendable arm 12 can work with various workpieces having complex configurations, and hence is highly versatile in applications. The arm is so assembled of relatively less rigid parts as to provide a simple construction which is equivalent or compatible to that which is made of more rigid parts. The arm can be actuated to position free end thereof as desired without being subjected to undue flexing. The flexible arm can be bent through a sufficient angular distance with a small degree of displacement of the hydraulic actuator, and hence is highly efficient in use or can make the more use of the advantages resulting from the bendability of the flexible arm. The actuator for rotating the manipulator tool is mounted on the free end of the flexible arm for directly controlling the tool for angular movement. Thus, the manipulator arm is free of any backlash and can be positioned as desired.

What is claimed is:

1. A manipulator arm for a programme controlled manipulator comprising:
   a base member,
   a first rotary actuator supported by the base member, a flexible arm having one end, and having first, second and third arm members and a link member, said first arm member, which defines said one end of said flexible arm, being fixedly attached at one end thereof to said first rotary actuator to be rotated about an axis of said base member by rotation of said first rotary actuator, said second arm member being swingably coupled at a first portion thereof to said first arm member, said third arm member being swingably coupled to a second portion of the second arm member, said link member being swingably coupled at one end thereof to the other end of said first arm member, the other end of said link member being coupled swingably to one end of said third arm member, a straight line which connects said one end of said link member with said other end of said link member crossing a straight line which connects said first portion of said second arm member with said second portion of said second arm member,
   a second rotary actuator including a stationary member fixedly mounted on a free end of said flexible arm, and a rotatable member rotatably mounted on said stationary member, in which said stationary member co-operating with said rotatable member to directly produce a rotational force for rotating said rotatable member when actuating power is supplied to said second rotary actuator,
   a tool attached to said rotatable member of said second rotary actuator,
   a third actuator connected to said second arm member for angularly moving said second arm member about said first protion of said second arm member relative to said first arm member,
   whereby said manipulator arm is capable of directly rotating said tool without backlash so that said manipulator arm is capable of precisely positioning said tool on the free end of said flexible arm to desired angular positions.

2. A manipulator arm according to claim 1 wherein said stationary member is a casing in which oil is contained, said rotatable member being a rod which extends rotatably through said casing, and wherein said second rotary actuator includes a pair of compartment members fixed to said casing and rod, respectively, to define two chambers in said casing, said rod rotating about an axis thereof when oil under pressure is supplied into one of said chambers.

3. A manipulator arm according to claim 2 wherein said casing of said first rotary actuator includes at least two annular grooves defined in a surface thereof against said rod and holes communicating said annular grooves with an exterior of said casing of said first rotary actuator, said base member having passages opening into said annular grooves, said second rotary actuator being supplied with said actuating power through said passages, annular grooves and said holes.

4. A manipulator arm according to claim 1 wherein said base member is a rod, said first rotary actuator comprising a casing rotatably mounted on said base member for containing oil therein, and a pair of compartment members fixed to said base member and said casing, respectively, to define two chambers in said casing, said first arm member of said flexible arm being fixedly mounted on said casing, said casing rotating about said axis of base member when one of said chambers is supplied with oil under pressure.

5. A manipulator arm according to claim 1, said arm members being coupled through bearings each other and said link members being coupled with arm members through bearings, each of said bearings having means for preventing a backlash from being developed therein.

6. A manipulator arm according to claim 5 wherein each of said bearings having inner and outer races, said means urging said inner and outer races to be axially displaced relatively to each other.

7. A manipulator arm according to claim 1, said third actuator comprises a cylindrical body and a piston rod movably mounted on said cylindrical body.

8. A manipulator arm according to claim 7, said cylindrical body being swingably mounted on said first rotary actuator, said piston rod being swingably coupled at one end thereof to said second arm member.

* * * * *